Sept. 20, 1949.  C. C. SPREEN  2,482,697
HANDLE FOR UTENSILS AND MOUNTING THEREFOR
Filed March 25, 1946  2 Sheets-Sheet 1
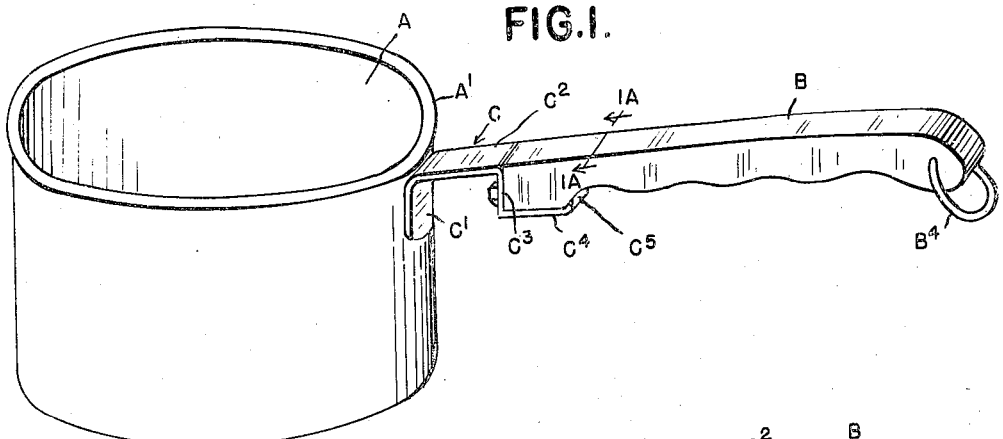
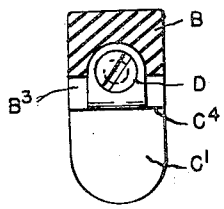
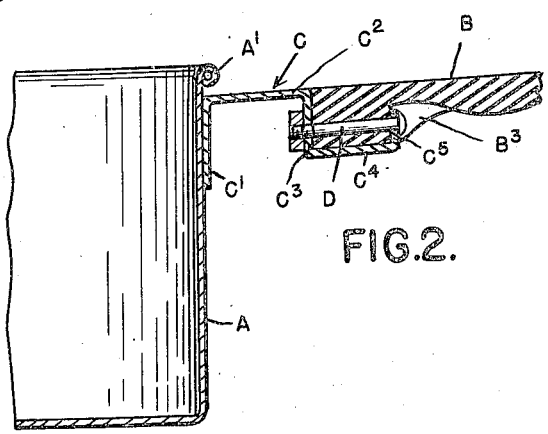
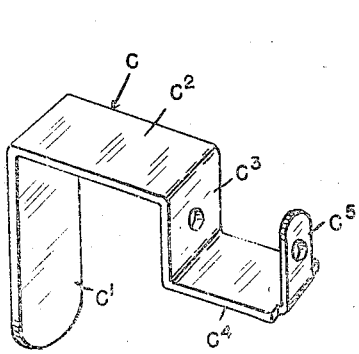
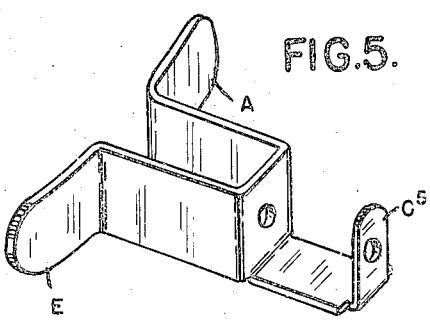
INVENTOR.
CHARLES C. SPREEN
BY
Whittemore Hulbert & Belknap
ATTORNEYS Sept. 20, 1949.          C. C. SPREEN          2,482,697
HANDLE FOR UTENSILS AND MOUNTING THEREFOR
Filed March 25, 1946                    2 Sheets-Sheet 2
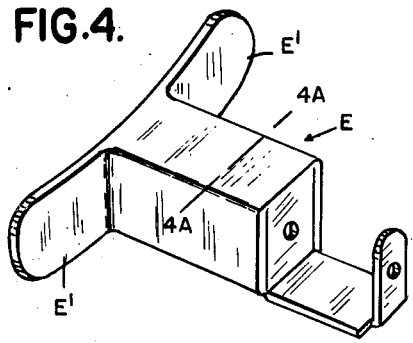
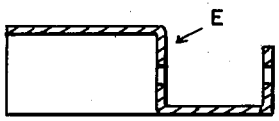
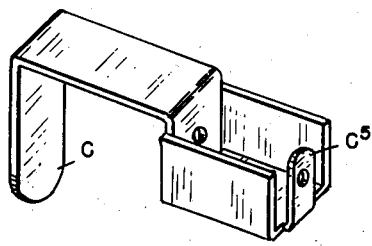
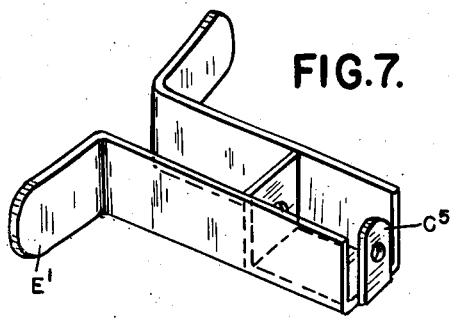
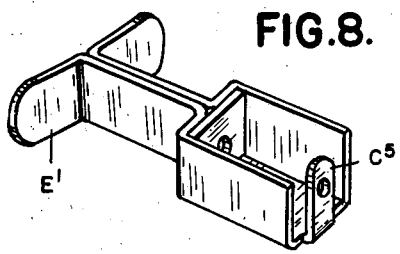
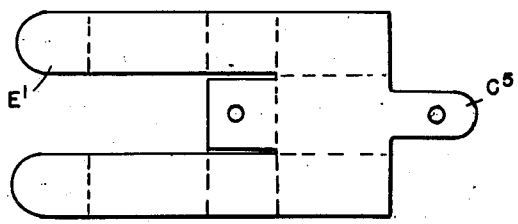
*INVENTOR.*
CHARLES C. SPREEN
BY
*Whittemore Hulbert & Belknap*
ATTORNEYS Patented Sept. 20, 1949

2,482,697

UNITED STATES PATENT OFFICE 2,482,697

HANDLE FOR UTENSILS AND MOUNTING THEREFOR

Charles C. Spreen, Detroit, Mich., assignor to Richard W. Lewis, Walled Lake, Mich.

Application March 25, 1946, Serial No. 656,919

3 Claims. (Cl. 16—110)

The invention relates to handles designed for use on various utensils and more particularly cooking utensils.

It is the primary object of the invention to form the hand grip of said handle of moulded plastic material or other material relatively low in thermal conductivity.

It is a further object to secure the hand grip portion in spaced relation to the utensil so as to remove it from the high heat.

It is a still further object to obtain a construction in which the mounting for the hand grip portion is more or less shielded by the latter so as not to come in contact with the hand of the user.

With these and other objects in view, the invention consists in the construction as hereinafter set forth.

In the drawings:

Fig. 1 is a perspective view of a utensil having my improved handle mounted thereon;

Fig. 1A is a section on the line 1A—1A, Fig. 1;

Fig. 2 is a longitudinal section through a portion of the utensil and handle showing the attachment means therefor;

Fig. 3 is a perspective view of the bracket forming the attachment means between the handle and utensil;

Fig. 4 is a similar view of a modified construction;

Fig. 4A is a cross section on the line 4A—4A, Fig. 4;

Fig. 4B is a central longitudinal section of Fig. 4;

Figs. 5, 6, 7 and 8 are perspective views showing other modifications of bracket;

Fig. 8A is a plan view of the blank from which the bracket, Fig. 8, is formed.

While my improved handle is applicable to various types of utensils, I have illustrated its attachment to a saucepan A of substantially cylindrical form having a bead A' at its upper edge. The handle comprises a hand grip member B preferably formed of moulded plastic material and suitably fashioned. This member extends laterally from the utensil but is spaced therefrom so as to avoid the flame or hot gases passing upward along the outer side thereof. The connection between the hand grip portion B and the utensil is formed by a bracket C. This may be of any suitable heat resistant material but preferably metal and preferably a construction which can be struck up from a flat sheet metal blank. As illustrated in Figs. 1 to 3, the bracket C is substantially Z-shaped in side elevation having a flange C' for attachment to the wall of the utensil by riveting, welding, or by any other suitable means. $C^2$ is an outwardly extending portion from the upper end of the flange C', $C^3$ a downturned portion, $C^4$ a portion extending outwardly from the lower end of the portion $C^3$, and $C^5$ an upturned ear portion. The hand grip member B is preferably formed with a corrugated lower surface B' for engagement with the fingers of the hand and has at its inner end a downturned lug $B^2$ for fitting between the portion $C^3$ and $C^5$ of the bracket. A bolt D extends through aligned apertures in the lug $B^2$ and portions $C^3$ and $C^5$ and securely fastens these members together.

The member B preferably has gusset flanges $B^3$ between the lug $B^2$ and the body of the handle for strengthening the structure and also forming guards for keeping the hand out of contact with the metal bracket. Thus, the utensil may be lifted by grasping the member B and without contacting the hand with the bracket C. The ring $B^4$ is preferably engaged with the outer end of the member B and forms a means for suspending the utensil on a hook.

The attachment and spacing bracket may be variously formed and, as shown in Fig. 4, a bracket E is of inverted U cross section and has oppositely extending ears E' at its inner end for attachment to the utensil. The outer portion of the structure is the same as shown in Fig. 3. The modifications in form of the bracket illustrated in Figs. 5 to 8 inclusive, may all be struck up from a flat sheet metal blank and need no further description; however, the construction shown in Fig. 8 is formed from the blank F shown in Fig. 8A. All of these constructions are similar in that they provide longitudinally spaced upwardly extending ears or flanges which embrace a depending lug at the inner end of the hand grip portion and are secured thereto by a longitudinally extending bolt.

In all of the constructions the essential feature is that the hand grip portion is spaced from the utensil. This space is bridged by the bracket portion which also is securely attached to the hand grip portion.

What I claim as my invention is:

1. A handle for utensils comprising a bracket member directly attached to the utensil and having an outwardly extending portion terminating in longitudinally spaced transversely extending parallel flanges connected by a bottom portion, a non-metallic hand grip member provided at its inner end with a depending lug portion embraced by said flanges, and a bolt extending longitudinally through aligned apertures in said flanges and lug for securing said non-metallic member to said bracket.

2. A handle for utensils comprising a bracket member directly attached to the utensil and extending laterally outward therefrom terminating in longitudinally spaced transversely extending flanges connected by an integral bottom portion, the outer flange being of less width than the inner flange, and a non-metallic hand grip member provided with a depending lug at its inner end embraced by said flanges and further provided with gussets extending outward from said lug and embracing and concealing the edges of said outer flange, and a longitudinally extending bolt extending through aligned apertures in said flanges and lug forming an attachment means for said non-metallic member.

3. A handle for utensils comprising a bracket member formed of pressed sheet metal, including a portion directly attached to the utensil, an outwardly extending portion terminating in longitudinally spaced parallel transversely extending flanges connected to each other by a bottom portion and forming an upwardly opening recess, a non-metallic hand grip portion provided with a depending lug at its inner end embraced by said flanges and having its upper face flush with the upper face of said bracket, and a bolt for securing said non-metallic member to said bracket passing through aligned apertures in said flanges and lug.

CHARLES C. SPREEN.

REFERENCES CITED

The following references are of record in the file of this patent:

UNITED STATES PATENTS

| Number | Name | Date |
|---|---|---|
| 1,809,060 | Nelson et al. | June 9, 1931 |
| 2,368,297 | Hanke | Jan. 30, 1945 |